US006218929B1

(12) United States Patent
Furuta et al.

(10) Patent No.: US 6,218,929 B1
(45) Date of Patent: Apr. 17, 2001

(54) DOOR ENTRY CONTROL BY WIRELESS COMMUNICATION

(75) Inventors: Noritoshi Furuta; Fumio Asakura; Hiroto Uesaka, all of Okazaki; Yuji Kato, Handa; Mitsugi Ohtsuka, Kariya, all of (JP)

(73) Assignees: Nippon Soken Inc., Nishio; Denso Corporation, Kariya, both of (JP)

(*) Notice: Subject to any disclaimer, the term of this patent is extended or adjusted under 35 U.S.C. 154(b) by 0 days.

(21) Appl. No.: 09/095,155

(22) Filed: Jun. 10, 1998

(30) Foreign Application Priority Data

Jun. 12, 1997 (JP) .................................................. 9-171009

(51) Int. Cl.[7] ........................................................ G06F 7/04

(52) U.S. Cl. ............................ 340/5.2; 340/5.1; 340/5.3; 340/825.69; 340/825.72; 340/10.1; 340/10.2; 340/10.3

(58) Field of Search ......................... 340/825.69, 825.31, 340/825.72, 825.54, 10.1–3, 10.31–33, 825.39, 5.1, 5.2, 5.3

(56) References Cited

U.S. PATENT DOCUMENTS 4,763,121 * 8/1988 Tomoda et al. ................. 340/825.54
4,794,268 * 12/1988 Nakano et al. .................. 307/10 AT
5,309,144 * 5/1994 Lacombe et al. .................... 340/539
5,379,033 1/1995 Fujii et al. ...................... 340/825.69
5,627,529 * 5/1997 Duckworth et al. ............ 340/825.69
5,723,911 * 3/1998 Glehr ................................. 307/10.2
5,973,611 * 10/1999 Kulha et al. .................... 340/825.31

FOREIGN PATENT DOCUMENTS 59-080872 5/1984 (JP) .
62-086278 4/1987 (JP) .
63-129643 8/1988 (JP) .
5-017055 3/1993 (JP) .
5-156851 6/1993 (JP) .
9-125776 5/1997 (JP) .

* cited by examiner

*Primary Examiner*—Michael Horabik
*Assistant Examiner*—William L. Bangachon
(74) *Attorney, Agent, or Firm*—Pillsbury Winthrop LLP

(57) ABSTRACT

In a vehicular entry control system, a code signal transmitter of a card carried by a driver modulates by a card-specific code a signal received from a transmitter/receiver of a control unit mounted in a vehicle and transmits the modulated signal to the control unit in return. The transmitter/receiver demodulates the modulated signal and a microcomputer automatically unlocks a vehicle door when the demodulated signal is correct indicating that the card is carried into a demodulating area. The microcomputer locks the door upon a driver's manual operation on a locking switch of the card. The microcomputer prohibits the automatic unlocking as long as the card is within the demodulating area after the locking in response to the manual operation.

11 Claims, 4 Drawing Sheets

FIG. 2A
FIG. 2B
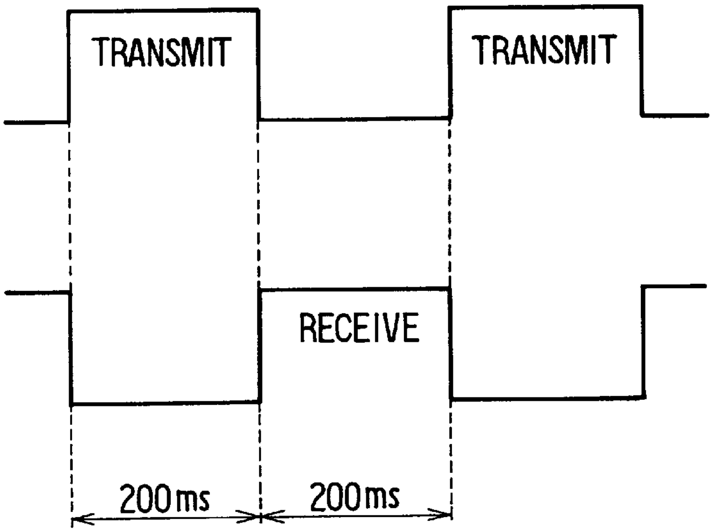
FIG. 3
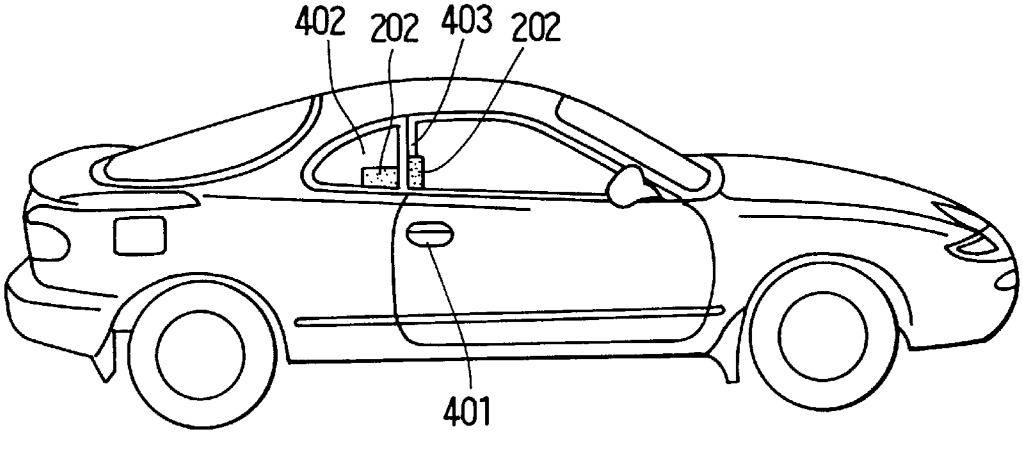

DOOR ENTRY CONTROL BY WIRELESS COMMUNICATION

CROSS REFERENCE TO RELATED APPLICATION

This application relates to and incorporates herein by reference Japanese Patent Application No. 09-171009, filed on Jun. 12, 1997.

BACKGROUND OF THE INVENTION

1. Field of the Invention

The present invention relates to a door entry control by wireless communication that can be used for vehicles or the like having an automatic door locking and unlocking mechanism.

2. Description of Related Art

There are proposed recently various automatic door entry control systems such as vehicle door control systems that unlock vehicle doors without use of a door key. Those systems are disclosed in JP-A-62-86278 or JP-U-63-129643. In one system, a signal transmitter held by a vehicle driver (user) transmits a specific code signal upon a driver's manual switch operation and a signal receiver mounted in a vehicle receives this code signal, so that the vehicle door may be locked and unlocked when the received code signal coincides with a certifying code. In another system, a signal transmitter/receiver mounted in a vehicle transmits a signal upon a driver's manual operation of a switch mounted in a vehicle door knob or the like, and a signal transmitter held by the driver transmits in return a code signal to the transmitter/receiver. Those systems require drivers to operate a switch manually, causing inconvenience when the driver has to carry many baggage or the like.

It is therefore proposed in JP-A-5-44367 to eliminate a driver's manual switch operation at the time of unlocking a vehicle door. In this system, a signal transmitter held by a driver continues to transmit a code signal for a certain time period after the turn-on of its door unlocking switch so that the door may be unlocked when the driver approaches to a signal receiver mounted in a vehicle after manually operating the door unlocking switch. Thus, this system also requires the driver to operate the door unlocking switch before approaching to the vehicle, shortening life of a battery in the transmitter.

It is also proposed in JP-A-5-156851 that a signal receiver mounted in a vehicle transmits a radio signal for searching an associated signal transmitter and the signal transmitter held by a driver transmits in return a coded radio signal to the receiver upon receiving the searching radio signal from the receiver. This system enables a vehicle door to be unlocked automatically without drive's manual switch operation for door unlocking. In this system, the vehicle door is locked and unlocked automatically whether the receiver is inside or outside of the radio signal receiving area. As a result, the vehicle door is locked if the driver leaves to an outside of a radio signal receiving area, even if the vehicle door is locked manually by the driver. Although it is possible to disable the transmitter to transmit the radio signal if the vehicle door has been locked manually, this requires the driver to change the mode of the transmitter from a door unlocking-disabling mode to a door unlocking mode without fail before the next use of the vehicle.

SUMMARY OF THE INVENTION

It is therefore an object of the present invention to improve the conventional door entry control for vehicles or the like by a wireless communication.

It is a further object of the present invention to provide a door entry control which enables manual door locking without requiring a user's additional manual operation for an automatic door unlocking.

According to the present invention, a signal transmitter held by a user modulates, in accordance with a code signal assigned specifically to each user, a signal received from a signal transmitter/receiver to transmit the modulated signal in return. When the user holding the transmitter enters from the outside of a signal demodulating area into the inside of the signal demodulating area, a door is switched automatically from the locked condition to the unlocked condition. After a manual door locking, the signal transmitter/receiver disables an automatic door unlocking as long as the modulated code signal is demodulated properly. Thus, the automatic door unlocking is enabled and disabled as long as the user is in the outside of the signal demodulating area and in the inside of the signal demodulating area, respectively. This requires no additional manual operation on the part of the user for switching between the automatic mode and the manual mode.

BRIEF DESCRIPTION OF THE DRAWINGS

Other objects, features and advantages of the present invention will become more apparent from the following detailed description made with reference to the accompanying drawings. In the accompanying drawings:

FIGS. 2A and 2B are time charts showing operation of the embodiment shown in FIG. 1;

FIG. 3 is a schematic view showing installation of antennas in the embodiment shown in FIG. 1;

DETAILED DESCRIPTION OF THE PREFERRED EMBODIMENT

Figure 1:
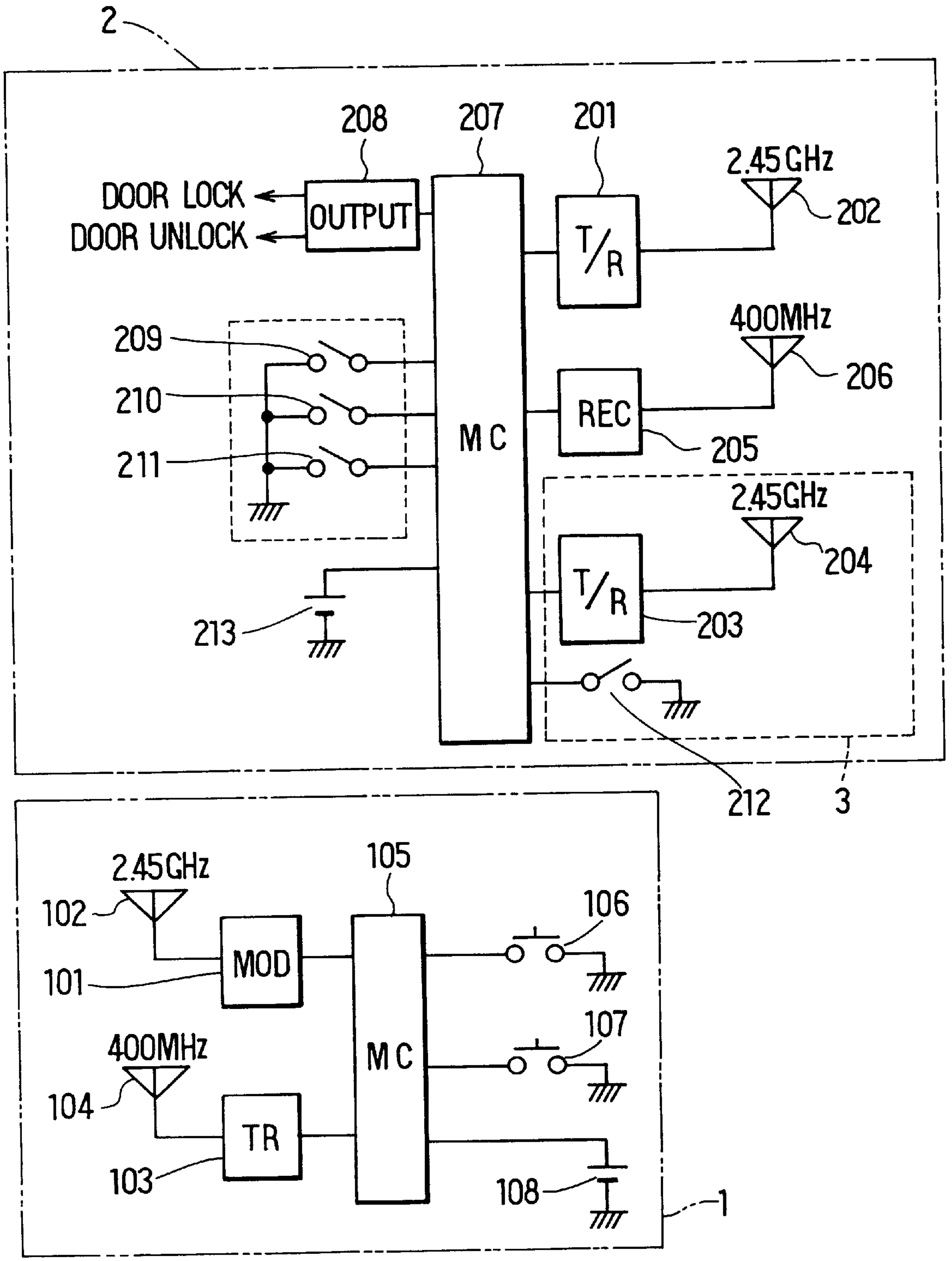
FIG. 1 is a block diagram showing a door entry control system according to an embodiment of the present invention.

A door entry control system according to an embodiment is applied to a vehicle. The control system generally comprises a smart card 1 such as a semiconductor integrated circuit type card held by a vehicle driver (user), and a door locking/unlocking control unit 2 mounted in a vehicle. The card 1 and the control unit 3 are constructed to perform a wireless communication.

The card 1 is a portable unit that includes therein a modulator circuit (MOD) 101 having a carrier frequency of 2.45 GHz, an antenna 102, a transmitter circuit (TR) 103 having a transmission frequency of 400 MHz, antenna 104 and a microcomputer (MC) 105. Those electronic circuits are supplied with electric power from a storage battery 108. The card 1 has thereon a door locking switch 106 and a door unlocking switch 107. Those switches 106, 107 are operable manually by the driver for instructing an automatic vehicle door locking and unlocking.

Specifically, the modulator circuit 101 modulates a radio signal of 2.45 GHz from the control unit 2 by a code signal produced from the microcomputer 105 and the antenna 102 transmits the modulated radio signal. The code signal is assigned to be specific to each card (vehicle user) 1 so that ID (identification) of each card may be certified by the code signal. This code signal is preferably encrypted when produced by the microcomputer 105.

The microcomputer 105 produces a door locking signal in response to manual activation of the locking switch 106 so that the transmitter circuit 103 modulates a radio signal of 400 MHz by the locking signal and the antenna 104 transmits the modulated radio signal. Similarly, the microcomputer 105 produces a door unlocking signal in response to manual activation of the unlocking switch 107 so that the transmitter circuit 103 modulates the radio signal of 400 MHz by the unlocking signal and the antenna 104 transmits the modulated radio signal.

The locking/unlocking control unit 2 includes a pair of transmitter/receiver circuits 201, 203 of 2.45 GHz and antennas 202, 204. It further includes a receiver circuit of 400 MHz, an antenna 206, a microcomputer 207 and an output circuit 208 for switching the locking and unlocking of vehicle doors. Those electronic circuits are supplied with electric power from a storage battery 213.

The transmitter/receiver circuits 201, 203 are constructed similarly to transmit radio signals of 2.45 GHz from associated antennas 202, 204 and to receive the radio signal transmitted in return from the card 1. The transmitter/receiver circuits 201, 203 demodulate the received radio signal to produce the code signals to the microcomputer 207. The microcomputer 207 is programmed to check whether the code signals produced from the transmitter/receiver circuits 201, 203 with a code assigned specifically to each vehicle and stored.

The microcomputer 207 turns on and off of the transmitting circuit sections of the transmitter/receiver circuits 201, 203 to operate the transmitter/receiver circuits 201, 203 as a signal transmitter and a signal receiver alternately as shown in FIGS. 2A and 2B. Each time period for signal transmission and signal reception has 200ms thereby to save electric power consumption.

The antenna 202 connected with the transmitter/receiver circuit 201 is mounted on the vehicle exterior, as shown in FIG. 3, for searching the card 1 held by the driver outside of the vehicle. Specifically, the antenna 202 is a patch type antenna having a high directivity and is attached to the exterior of a swing type window 402 or a pillar 403 near a door knob 401 at the side of a driver's seat. Thus, the transmitter/receiver circuit 201 limits its demodulating area, i.e., a wireless communication area in which the received signal can be demodulated accurately, to a certain distance from the door knob 401. The demodulating area may be about 1.5 m from the knob 401.

The antenna 204 connected with the transmitter/receiver circuit 203 is attached to a card holding case in the vehicle interior for searching the card 1 held by the driver inside of the vehicle. The card holding case 3 may be provided on an instrument panel near a steering wheel so that the driver may put the card 1 thereon after entering the passenger compartment.

The receiver circuit 205 demodulates the radio signal of 400 MHz received by the antenna 206 to produce a locking signal or an unlocking signal to the microcomputer 207. It is desired that the demodulating area of the received signal is not too limited to enable manual locking and unlocking by the driver. Therefore, the antenna 206 is a non-directional type and may be installed anywhere. It may be attached at the same position as the exterior antenna 202 for 2.45 GHz.

The microcomputer 207 is connected to various detector devices such as an engine switch 209 for detecting engine stop and engine rotation, a courtesy switch 210 for detecting opening and closing of the door, and a door locking switch 211 for detecting locking and unlocking of the door. The card holding case 3 has a card detecting switch 212 for detecting existence and absence of the card 1 thereon.

The microcomputer 207 is programmed to produce a door locking signal and a door unlocking signal to a door locking actuator (not shown) through an output circuit 208 in response to various received signals. The microcomputer 207 is further programmed to turn on and off the signal transmitting section of the transmitter/receiver circuit 201 in response to a door locking command and a door unlocking command so that the corresponding radio signal may be transmitted and not transmitted from the antenna 202, respectively.

Figure 4:
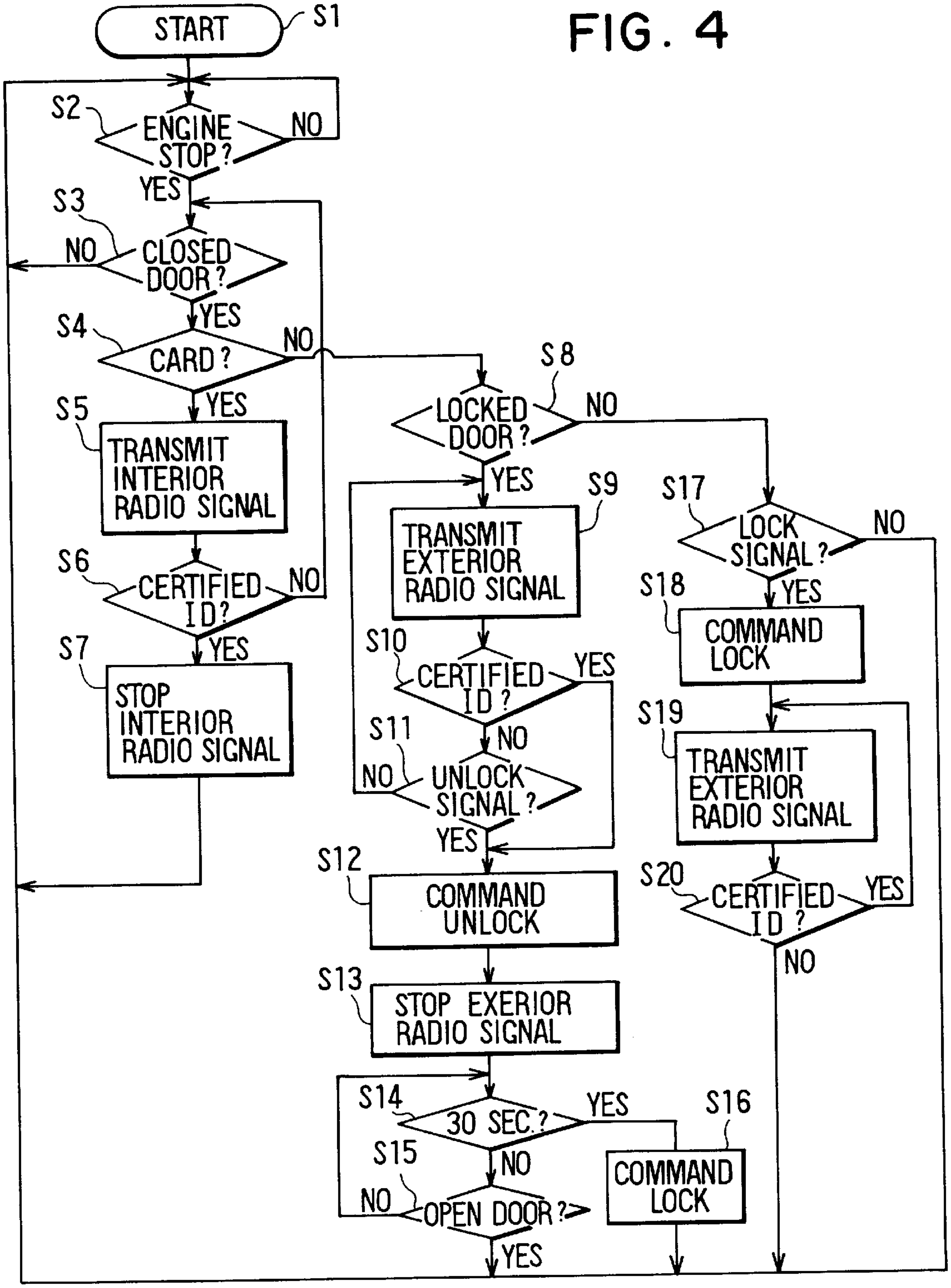
FIG. 4 is a flow chart showing a control process in the embodiment shown in FIG. 1.
Figure 5:
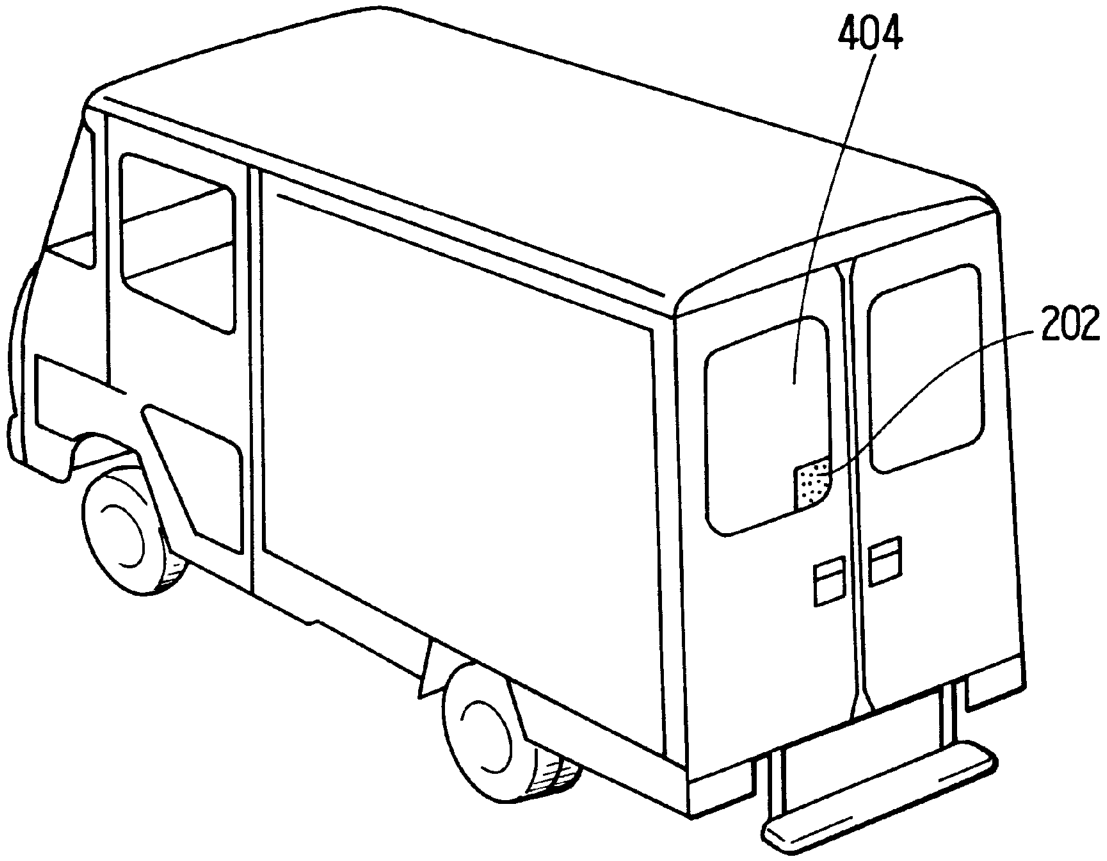
FIG. 5 is a schematic view showing installation of antennas in a modification of the embodiment shown in FIG. 1.

The operation of the above embodiment is described in more detail with reference to a control routine programmed in the microcomputer 207 as shown in FIG. 4.

The microcomputer 207 starts control routine at step S1 when the battery 213 is connected to supply an electric power in the control unit 3. The microcomputer determines at step S2 whether the engine is at a stop, then advancing to step S3 in response to only the YES determination (engine stop). The microcomputer 207 further determines at step S3 whether the vehicle door is closed. With the YES determination (closed door), the microcomputer 207 determines at step S4 whether the card 1 is on the card holding case 3. With the NO determination (no card), the microcomputer 207 determines at step S8 whether the door is locked. The YES determination (locked door) together with the foregoing determinations indicate that the driver is outside the vehicle such as before entering the vehicle.

The microcomputer 207 instructs at step S9 the transmission of the radio signal of 2.45 GHz from the antenna 202 on the vehicle exterior for searching the card 1. If the card 1 is within the signal demodulating area, that is, the driver is near the vehicle, the card 1 receives the radio signal at the antenna 102, modulates the received signal by the modulator circuit 101 in accordance with the code signal produced by the microcomputer 105, and transmits the modulated signal in return from the antenna 102.

The modulated signal is received by the antenna 202 and applied to the microcomputer 207 through the transmitter/receiver circuit 202 that demodulates the received modulated signal for identifying the ID of the card 1 from the code signal included in the modulated signal. The microcomputer 207 then determines at step S10 whether the ID of the card 1 coincides with the code that is specifically assigned to each vehicle and stored in the microcomputer 207. If the driver is away from the vehicle (that is, outside the wireless communication area) the electric field strength of the modulated signal received by the antenna 202 will be too low to be demodulated correctly for the ID certification at step S10. If the driver is close to the vehicle (that is, inside the wireless communication area), on the other hand, the electric field strength of the modulated signal received by the antenna 202 will be high enough to be demodulated correctly for the ID certification at step S10.

The microcomputer 207 further determines at step S11 whether the driver has instructed a door unlocking by the unlocking switch 107 on the card 1. This determination may be made based on another radio signal of 400 MHz modulated by the transmitter circuit 103 in response to the operation of the switches 106, 107 and transmitted from the antenna 104. This modulated signal is received by the antenna 206 and demodulated by the receiver circuit 205. With the YES determination (certified ID) at step S10 or the YES determination (unlocking signal) at step S11, the microcomputer 207 produces the door unlocking command signal to the output circuit 208 at step S12 thereby to effect the door unlocking automatically. The microcomputer 207 then stops a signal transmission operation of the transmitter/receiver circuit 201 and the antenna 202 at step S13.

With the No determinations (uncertified ID and no unlocking signal) at steps S10 and S11, the microcomputer 207 repeats steps S9 through S11 assuming that the driver is far away from the vehicle and the door unlocking is not instructed.

The microcomputer 207 determines at step S14 whether a predetermined time period, for instance 30 seconds, has elapsed after the automatic door unlocking operation. With the NO determination (less that 30 seconds), the microcomputer 207 determines at step S15 whether the door is open. With the NO determination (closed door), the microcomputer 207 returns to step S14 to continue the checking unless the door opens actually. With the YES determination (more than 30 seconds) at step S14, the microcomputer 207 assumes that the driver has no intention to enter the vehicle and produces at step S16 a door locking command to the output circuit 208 thereby to effect automatically the locking of the door once unlocked in step S12. After steps S15, S16, the microcomputer returns to step S2 to transmit the radio signal from the antenna 202 again as described above.

The microcomputer 207 assumes in response to the YES determination (open door) that the driver has entered the vehicle. In this instance, as long as the driver sets the card 1 in the holding case 3 in the vehicle compartment, the card 1 activates the card switch 212 so that the processing of the microcomputer 207 moves from step S4 to step S5 to cause the transmitter/receiver circuit 203 to transmit another radio signal of 2.45 GHz from the interior antenna S5. The card 1 transmits in return the radio signal modulated in the same manner as described above. This modulated signal is received by the antenna 204 and demodulated by the transmitter/receiver circuit 203 so that the code signal is applied to the microcomputer 207. The microcomputer 207 then certifies the ID code at step S6 in the same manner as in step S10. With the YES determination (certified ID) at step S6, the microcomputer 207 stops the transmission of the radio signal from the antenna 204 and returns to step S2. As long as the engine runs (NO determination at step S2) for a vehicle drive, the microcomputer 207 repeats only step S2.

When the engine stops after the vehicle drive, the control moves from step S2 to step S3. The driver will take up the card 1 from the holding case 3 and leave the vehicle after closing the door. In this instance, the control moves from step S3 to step S8 through step S4. The control will further move to step S17 because the door will not be locked (NO determination at step S8) immediately after the door closing.

The microcomputer 207 determines at step S17 whether a door locking instruction from card 1 is received by the antenna 206. This locking instruction may be issued by the driver's manual operation on the locking switch 106 and included in the radio signal modulated by the transmitter circuit 103 in the same manner as the radio signal is modulated by the door unlocking switch 107. The microcomputer 207 repeats steps S2–S4, S8, S17 unless the door locking instruction is issued from the driver. Upon reception of the door locking signal (YES determination at step S17), the microcomputer 207 produces at step S18 the door lock command to the output circuit 208 to effect door locking.

The microcomputer 207 then causes at step S19 the transmitter/receiver circuit 201 and the exterior antenna 202 to transmit the radio signal. As the driver will still be near the vehicle immediately after closing the door for leaving, the electric field strength of the radio signal received in return from the card 1 after the modulation by the code signal in the card 1 will be high enough to be demodulated by the transmitter/receiver circuit 201. The microcomputer 207 certifies at step S20 the ID of the card 1 in the same manner as in steps S6, S10. The microcomputer 207 repeats steps S19, S20 with the YES determination (certified ID). Thus, the door will be kept locked and the automatic unlocking is disabled, as long as long as the driver holding the card 1 is within the demodulating area from the vehicle. With NO determination at step S20 indicating that the driver has left far away from the vehicle, transmission of the radio signal from the transmitter/receiver circuit 201 and antenna 202 may be stopped. With NO determination (no manual locking instruction) at step S17, the control of the microcomputer 207 returns to step S2. In this instance, it is preferred to perform the radio signal transmission and the ID certification as in steps, S18, S19, and to lock the door automatically as in step S18 if the ID certification becomes impossible.

The electric field strength of the radio signal transmitted from the card 1 will become too low to demodulate in the control unit 2 as the driver leaves far away from the vehicle. Thus, the microcomputer 207 repeats steps S9–S11 after steps S2–S4, S8 as in the case of driver's approaching to the vehicle. If the driver approaches closely enough to the vehicle again even immediately after the locking of the door, the door will be unlocked automatically through steps S10 and S12 without manual activation of the door unlocking switch 107 by the driver.

It is to be noted in the above embodiment that the electric power consumption can be minimized, because the microcomputer 207 disables at step S13 the radio signal transmission from the transmitter/receiver circuit 201 and the antenna 202 in response to the door unlocking signal from the card 1 and enables at step S19 the radio signal transmission in response to the door locking signal from the card 1. It is also possible to minimize the power consumption by other control or to eliminate the minimization of power consumption.

In the control returning from step S15 to step S14, a door locking signal checking step that is the same as step S17 may be executed so that the control moves to step S18 with the reception of the locking instruction from the card 1. This enables the door locking even before the elapse of 30 seconds.

It is also possible to eliminate steps S14–S16 that automatically locks the door when the door is not opened for the predetermined time period. In this instance, after the door is unlocked at step S12 the control moves to step S17 from steps S2–S4, S8. Therefore, the door locking is effected only by the activation of the locking switch 106 on the card 1.

Although the door locking may be effected only by the activation of the door locking switch 106, the door is preferably locked automatically when the driver leaves away out of the demodulating area of the control unit 2. This automatic locking may be performed as disclosed in JP-A-5-156851. That is, after the door locking (steps S17, S18) by the activation of the door locking switch 106, the door unlocking may be prohibited as long as the card 1 is in the demodulating area from the vehicle so that the automatic unlocking and the locking by the manual switch operation may not collide. Thus, when the driver approaches to the vehicle next time to enter the vehicle, the door will be unlocked automatically without any manual switching operation on the part of the driver. As this system is capable of locking the door automatically, this modification will be advantageous particularly in vehicles such as a package delivery vehicle from which packages are loaded into and unloaded from the vehicle frequently. In this instance, the exterior antenna 202 is mounted preferably on both of the vehicle door at the driver's seat side and the rear package loading/unloading door 404.

Still further, the frequency of the radio signals may be other than 2.45 GHz and 400 MHz, and the infrared signal may be used for a wireless communication between the card 1 and the control unit 2 instead of the radio signal.

The manual locking of the door may be performed not only by the manual switch operation on the card 1 but also by a conventional ignition or door key as long as the door is operable by a wireless locking/unlocking mechanism and by a mechanical key locking/unlocking mechanism.

Still further, the present invention is not limited to doors in a vehicle as disclosed in the above embodiment and its modifications. The present invention may also be applied to other doors as in buildings or the like.

What is claimed is:

1. A passenger entry control system for a vehicle comprising:

code signal transmitting means for modulating a fixed frequency signal transmitted from the vehicle using a code assigned specifically to the vehicle and transmitting the modulated code signal;

transmitting/receiving means mounted in the vehicle for transmitting the fixed frequency signal and receiving the code signal;

switching control means mounted in the vehicle for switching automatically a door of the vehicle from a locked condition to an unlocked condition when the code signal from the code signal transmitting means is received and demodulated; and manual locking means for causing the switching control means to switch the door to the locked condition from the unlocked condition upon manual operation of the code signal transmitting means, wherein the switching control means is set to disable the automatic unlocking of the door after the manual locking means causes the switch control means to switch the door to the locked condition and while the code signal from the code signal transmitter means continues to be received and demodulated correctly by the transmitting/receiving means, the switch control means ceasing disablement of the automatic unlocking when the switch control means detects that the code signal transmitting means is moved outside a code signal demodulating area by detecting that the code signal transmitter no longer continues to correctly receive and demodulate the code signal.

2. The control system as in claim 1, wherein:

the manual locking means includes a locking signal transmitting means provided integrally with the code signal transmitting means for transmitting a locking signal modulated by the manual operation on the manual locking means, and locking signal receiving means mounted in the vehicle for receiving the modulated locking signal from the locking signal transmitting means; and the switching control means is set to change from the door unlocking condition to the door locking condition in response to a demodulation of the modulated locking signal by the locking signal receiving means.

3. The control system as in claim 1, further comprising:

transmission control means mounted in the vehicle for controlling the transmitting/receiving means to transmit the fixed frequency signal when the door is locked and to stop transmitting the fixed frequency signal when the door is unlocked.

4. The control system as in claim 1, further comprising:

door opening/closing detecting means for detecting an opening and closing of the door, wherein the switching control means is set to lock the door when the door is kept closed for a time period after the door is unlocked.

5. The system of claim 1, wherein the switching control means is set to maintain the locking condition of the door after the manual locking means causes the switch control means to switch the door to the locked condition and while the code signal from the code signal transmitter means continues to be received and demodulated correctly by the transmitting/receiving means.

6. The system of claim 1, wherein the code signal transmitting means further includes:

a first receiving antenna arranged to receive the fixed frequency signal from the transmitting/receiving means;

a modulator circuit for modulating the signal received by the receiving antenna; and a first transmitting antenna arranged to transmit the modulated signal from the modulator circuit as the code signal.

7. The system of claim 6, wherein the transmitting/receiving means further includes:

a second receiving antenna arranged to receive the code signal from the first transmitting antenna; and a second transmitting antenna arranged to transmit the fixed frequency signal to the first receiving antenna.

8. The system of claim 7, wherein the first receiving antenna and the second transmitting antenna have a carrier frequency of approximately 2.45 GHz and the first transmitting antenna and the second receiving antenna have a transmission frequency of approximately 400 MHz.

9. A method of controlling entry of a user through a door by wireless communication between a portable unit and a control unit connected with the door, the method comprising the steps of:

unlocking the door automatically when the portable unit is moved from outside of a predetermined communication area from the control unit to inside the predetermined communication area;

locking the door in response to a door locking instruction signal transmitted from the portable unit upon a manual operation on the portable unit; and disabling the automatic unlocking of the door when the door is locked in response to the door locking instruction signal and when the portable unit is inside of the predetermined communication area, and ceasing the disablement of the automatic unlocking based on a detection of the portable unit leaving the predetermined communication area.

10. The method as in claim 9, wherein both unlocking the door automatically and disabling the automatic unlocking include:

transmitting a signal from the control unit to the portable unit;

modulating the signal at the portable unit in accordance with a code assigned to the portable unit;

transmitting the modulated signal from the portable unit to the control unit;

demodulating the modulated signal at the control unit; and determining whether the portable unit is inside the predetermined communication area from the demodulated code.

11. The method as in claim 10, wherein:

the modulated signal is transmitted to the portable unit intermittently.

* * * * *